March 12, 1929.  G. B. CROUSE  1,704,791
RECTIFYING ALTERNATING CURRENT
Filed July 1, 1926  2 Sheets-Sheet 1
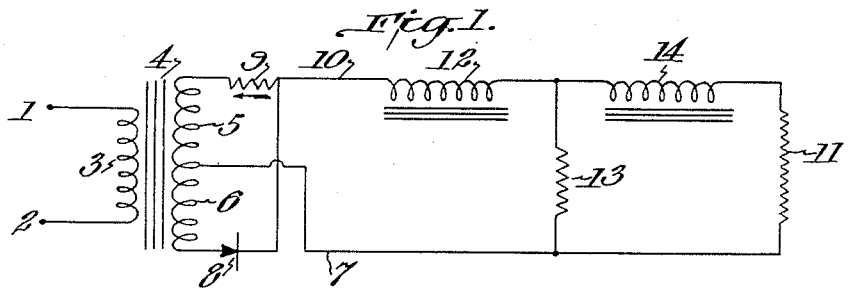
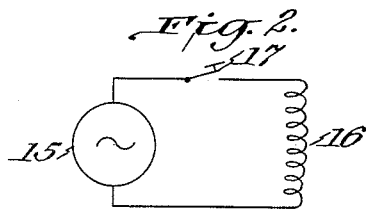
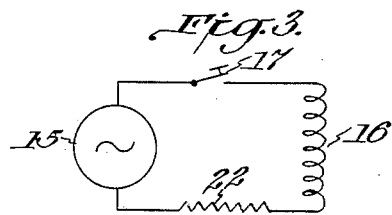
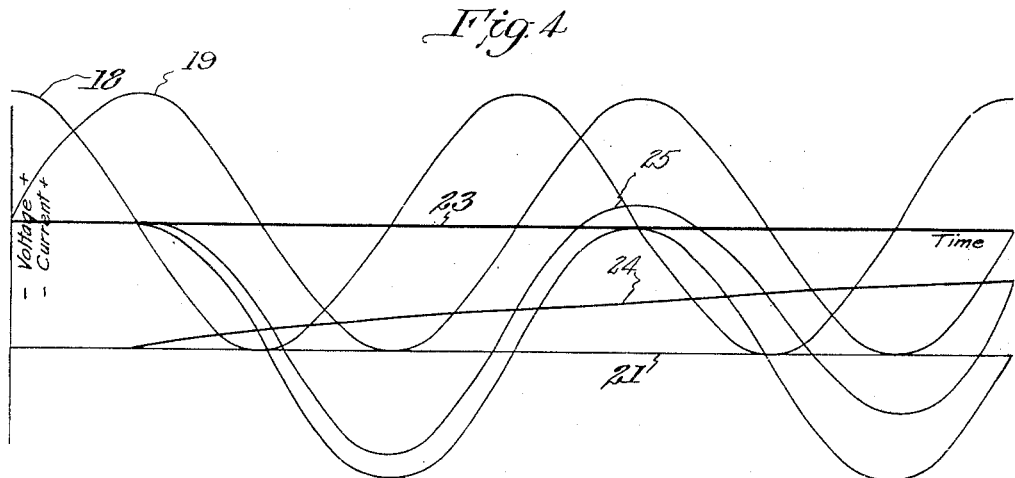
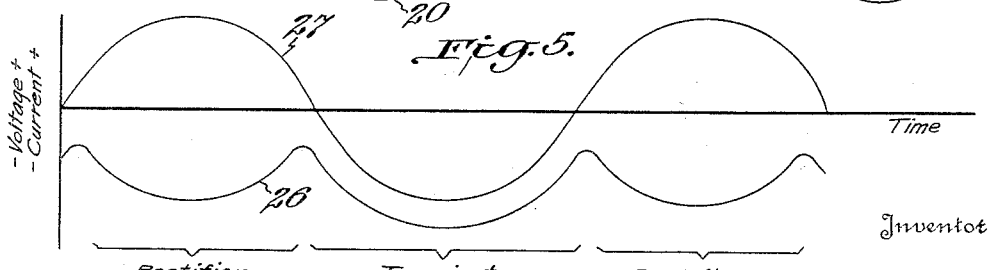

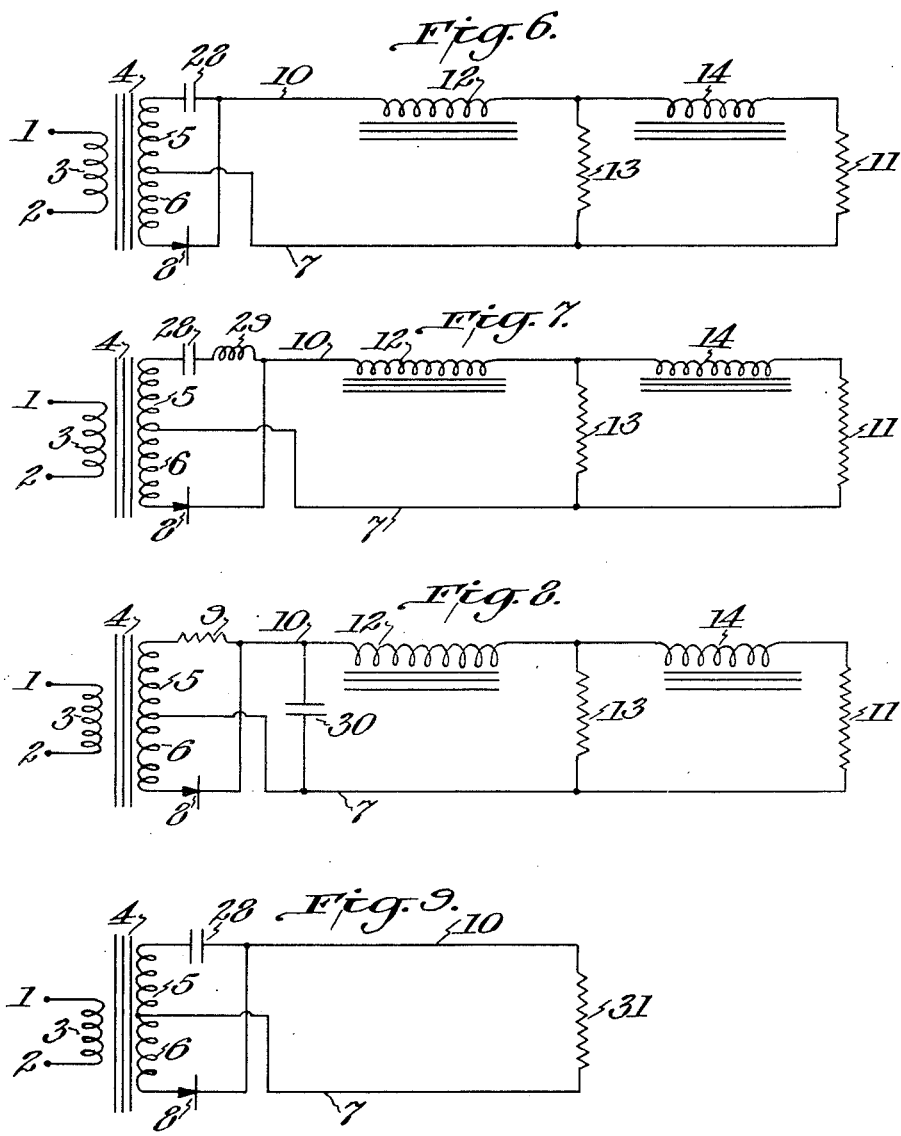

Patented Mar. 12, 1929.

1,704,791

UNITED STATES PATENT OFFICE.

GEORGE B. CROUSE, OF WOODCLIFF, NEW JERSEY, ASSIGNOR TO CONNER CROUSE CORPORATION, OF NEW YORK, N. Y., A CORPORATION OF NEW YORK.

RECTIFYING ALTERNATING CURRENT.

Application filed July 1, 1926. Serial No. 119,959.

This invention relates to methods of rectifying alternating currents and more particularly to the rectification of such currents for use in conjunction with filters, the filtered output to be used for telephone and radio telephone and telegraph apparatus.

It is a well known fact that when alternating current is rectified and the rectified output is filtered to obtain smooth direct current for a load circuit, the size of the filter will be substantially reduced when both halves of the alternating current wave are utilized in the filter input. One well known method of obtaining this so-called double wave rectification is shown in my copending application, Ser. No. 680,096, filed December 12, 1923. In the method shown therein I employ two separate rectifiers. It is possible, of course, to build a double wave rectifier in a single structure, but in both the hot cathode gas-filled tubes and the cold cathode gas-filled tubes which are now on the market there are structural and operating difficulties encountered, due to the tendency of the anodes to arc between themselves and put the tube out of action.

Objects of this invention are to provide a method of and apparatus for rectifying both halves of an alternating current wave which will utilize only one rectifier of a standard single-wave type, and which will be economical of material and power when put into practice. A further object accomplished by the invention is the provision of a method of and apparatus for delivering a rectified current output of a wave shape which may be readily filtered.

The method by which these objects are accomplished may be briefly stated as causing the alternating current to be rectified to be divided to form two separate sources of energy, causing energy to flow from one source through a rectifier to a circuit system containing the load and from the other source to the circuit system through an ordinary linear impedance and so relating all of the elements of the system that the energy flow from the second source is controlled in direction by the rectifier to cause a unidirectional flow of energy to the load circuit.

Referring now to the drawings which form a part of this specification,

Fig. 1 is a circuit diagram of one form of the invention;

Figs. 2 and 3 are electrical diagrams for explanatory purposes;

Fig. 4 is a graph of the current-voltage relations existing in the circuits of Figs. 2 and 3;

Fig. 5 is a graph of current-voltage of the circuit of Fig. 2; and

Figs. 6, 7, 8 and 9 are circuit diagrams of other embodiments of the invention.

In Fig. 1 the reference numerals 1 and 2 identify the terminals of an alternating current supply connected to the primary 3 of the transformer having an iron core 4 and a pair of secondaries 5 and 6 to form the separate alternating current sources. These secondaries are connected in series and their junction is brought out to form, say, the negative wire 7. The outer end of the secondary 6 is connected to the rectifier 8 and the other end of 5 is connected to the resistance 9, the free terminals of this resistance and the rectifier being connected together and to the wire 10. The rectifier system is thus completed and may then be connected to the load circuit 11 through a filter which is represented by the coil 12, the resistance 13 and the coil 14.

To understand the operation of the system consider the simple circuit shown in Fig. 2 in which 15 is a source of alternating current connected to an ideal inductance 16 through a key 17. In Fig. 4 the voltage of the alternator 15 of Fig. 2 is shown at 18. If the key 17 is closed at the instant when the voltage 18 is maximum the current flowing in the circuit will be a sine wave lagging the voltage by 90 time degrees, as shown at 19. If, however, the key is closed at the instant when the voltage 18 is zero, the axis of the current wave will be shifted downward by an amount equal to the amplitude of the current wave so that the current now will be represented by the line 20 about the axis 21. From this it appears that in a circuit containing no resistance we may obtain a unidirectional pulsating current by closing this circuit at the proper instant. If now we add a small resistance to this circuit as indicated at 22 in Fig. 3 and again close the key 17 at the instant when the voltage 18 is approximately zero, we find that the current axis will again be shifted about as before at the beginning of the action, but instead of being parallel to the voltage axis 23 it will approach this axis in an exponential manner, as indicated by the line 24, the current being now represented as the line 25. We thus see that even with a resistance added to the circuit, by closing it at the proper time we may obtain a rectified current over a period in excess of a half a cycle. (For complete mathematical discussion of the above phenomenon see Steinmetz "Transient Electric Phenomena and Oscillations", Chapter IV, McGraw-Hill Publishing Company, Third Edition, 1920.)

Returning now to Fig. 1, during a part of one-half of the voltage cycle the rectifier 8 will pass current from the secondary 6 to the load circuit 11 through the filter. At the same time energy will be passed through the rectifier from both secondaries 5 and 6 through the resistance 9 in the direction shown by the arrow. At or near the end of the voltage half cycle the rectifier will cease to pass current either to the load or to the resistance 9, and the secondary 5 is then connected to the load circuit through the reactances 12 and 14 and the transient current wave 25 of Fig. 4 is set up in this circuit. A little consideration will show that this transient current which flows during the next or second half cycle will be in the same direction through the load as the current from the rectifier in the first half cycle. On the next following or third half cycle the rectifier will again pass current, serving at the same time to extinguish the transient from the secondary 5 through the load circuit. The above sequence of events is then indefinitely continued. The resulting current in the leads 7 and 10 will be somewhat as shown in Fig. 5 at 26, the voltage wave being indicated at 27. This current may then be filtered to form a smooth current for the load circuit 11 by the filter network shown in Fig. 1 or by any other type of filter.

It is not essential that the element of linear conductivity in the auxiliary circuit take the form of a resistance. As shown in Fig. 6, a condenser 28 may be substituted for the resistance 9 of Fig. 1, the other circuit elements being identical with those of Fig. 1 and being correspondingly numbered. The use of a condenser in place of a resistance is generally more advantageous in rectifier systems delivering relatively high voltages at low currents. During the time that the rectifier 8 is passing current, as pointed out above, some current is wasted in the resistance 9 and if the voltages of the secondaries 5 and 6 are high this current becomes excessive. By employing a condenser 28 no direct current is allowed to pass through this path and the energy losses are thus reduced. It should be noted that this condenser 28 is of much smaller value, for a given output current, than the usual storing condenser. A further decrease in the size of the condenser may be effected by inserting an inductance 29 in series with the condenser 38, as shown in Fig. 7.

While in all of the above the active circuit system has been shown and described as inductive reactance, the system will operate and many of its advantages be retained by the use of condenser reactance. A circuit employing condenser reactance is shown in Fig. 8 the reactance being indicated at 30. The other parts of the circuit are identical with the previous figures and are identically numbered. The operation of this circuit will be clear from the prior descriptions.

The rectifier system has so far been described as working into a filter network of reactive impedance. The method may be employed, however, and many of its advantages retained in cases where the load circuit is purely resistive in character, in which case the circuits would take the form shown in Fig. 9. In this figure 31 is the resistive load. While I have shown the linear impedance element as a condenser 28, this element may be of any type, either resistive, capacitative, or inductive, but I prefer a reactive impedance as under these circumstances the current of the load circuit never falls to or below zero, which is the case when the impedance element is predominately resistive.

The direct current circuits which are to be energized from the rectifier may be of such character that the use of a filter mesh for suppressing alternating components is required. When a filter mesh is employed, the magnitude and the character of the linear impedance of the rectifier will be determined by the impedance into which the rectifier works, that is, by the elementary circuit in which the rectifier is included. In the circuit of Fig. 1, the effective impedance into which the rectifier works is the serially arranged inductance 12 and resistance 13, while in the circuit of Fig. 8, the impedance into which the rectifier works is the capacity 30. It is not essential, however, that the rectifier work into a reactive impedance and it is therefore to be understood that the particular filter meshes which have been described in connection with the rectifier do not form a part of the invention.

By analogy to a Wheatstone bridge, the rectifying system may be considered as a series arrangement of an asymmetric conductor and three linear conductors, the alternating current voltage being impressed across one terminal of the asymmetric conductor and the conjugate junction point of the system, and the direct current load circuit being connected across the other pair of conjugate junction points. The invention is not restricted to the use of an inductive coupling between the power line and the rectifier system, since the line may be conductively coupled to the outer terminals of the series impedances 5 and 6, which may be inductive or resistive in character.

I claim:

1. The method of continuously supplying unidirectional current to a load circuit from an alternating current source which comprises delivering energy to said load circuit through a half-wave rectifier and establishing a transient current from said source through the load during successive intervals when the rectifier is non-conducting.

2. The method of continuously supplying unidirectional current to a load circuit from an alternating current source which comprises periodically delivering current to said load circuit from said source through a path of asymmetric conductivity, and delivering current from said source to said load circuit through a path having linear conductivity for alternating currents during the periods when no current flows in the first path.

3. In rectifying apparatus, the combination with a source of alternating current, a half-wave rectifier and the load line energized therefrom, of means establishing a transient current flow from said source through said load line during successive intervals when the rectifier is non-conducting, whereby unidirectional current will be supplied to said circuit.

4. The method of continuously supplying unidirectional current to a load circuit from an alternating current line which comprises dividing the supplied energy into two sources, delivering energy from one source to said load through a rectifier, delivering energy from the second source through a path having linear conductivity for alternating currents, and controlling the direction of energy flow from said second source by the energy flow from said first source.

5. In rectifying apparatus, a rectifier and impedance connected in series and adapted to be connected across an alternating current source, the junction of said rectifier and impedance serving as a terminal for one side of a unidirectional current load line, and means for connecting the opposite side of said load line to a point having an alternating current potential intermediate that of the said source.

6. Rectifying apparatus of the type effecting double wave rectification, characterized by a single wave rectifier and three impedances having linear conductivity for alternating currents all connected in series to form a closed network, one terminal of the rectifier and its conjugate junction point of the network serving as input terminals for the alternating current, and the other pair of junction points serving as output terminals for direct current.

7. Rectifying apparatus comprising a pair of series impedances, and a single wave rectifier and a third impedance connected in series and across the free terminals of said series impedances, each of said impedances having linear conductivity of alternating currents the free terminals of said series impedances serving as input terminals for alternating current and the common terminal of said series impedances serving with the junction point of said rectifier and third impedances as output terminals for direct current.

8. In rectifying apparatus, a transformer having a secondary winding tapped at an intermediate point, and a rectifier and impedance connected in series and across said winding, the junction of said rectifier and said impedance serving with the tap on said winding as terminals for a load circuit.

9. In apparatus for supplying unidirectional current to a reactive load circuit from an alternating current source, means for delivering a rectified half-wave from said source to said load circuit, and an auxiliary circuit of symmetrical conductivity energized by said source and connected across said load circuit to deliver current thereto in the same direction as that delivered by said means when the latter is non-conducting.

10. In apparatus for supplying unidirectional current to a load circuit from an alternating current source, a circuit energized by said source and including a rectifier for delivering current to said load circuit, a second circuit energized by said source and having linear conductivity for alternating currents, said second circuit being so connected to said first and load circuits that transient current established therein when said first circuit becomes non-conductive flows through the load circuit in the same direction as current passed by said rectifier.

11. In apparatus for supplying unidirectional current from an alternating current source, a transformer having two secondaries with one terminal in common, and a rectifier and an impedance in series and connected across the other terminals of said secondaries, the sense of the windings of said secondaries being such that a load line connected across their common terminal and the junction of said rectifier and impedance is supplied with unidirectional current.

In testimony whereof, I affix my signature.

GEORGE B. CROUSE.